(12) United States Patent
Iwazaki

(10) Patent No.: US 6,705,781 B2
(45) Date of Patent: Mar. 16, 2004

(54) PRINTING SERVICE METHOD FOR PRINTING SYSTEM AND THE PRINTING SYSTEM

(75) Inventor: Ryuji Iwazaki, Shizuoka-ken (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 218 days.

(21) Appl. No.: 09/961,856

(22) Filed: Sep. 24, 2001

(65) Prior Publication Data

US 2002/0038612 A1 Apr. 4, 2002

(30) Foreign Application Priority Data

Oct. 3, 2000 (JP) ........................................ 2000-303769

(51) Int. Cl.[7] .................................................. B41J 5/30
(52) U.S. Cl. ............................ 400/62; 400/61; 400/70; 400/76; 358/1.15; 358/1.18
(58) Field of Search .................................. 101/483, 484; 400/61, 62, 70, 76; 358/1.1–1.18

(56) References Cited

U.S. PATENT DOCUMENTS

| 5,964,847 | A | * | 10/1999 | Booth et al. .................... 710/1 |
| 6,128,661 | A | * | 10/2000 | Flanagin et al. ............ 709/227 |
| 6,240,445 | B1 | * | 5/2001 | Kumar et al. ................ 709/206 |
| 6,275,848 | B1 | * | 8/2001 | Arnold ........................ 709/206 |
| 6,405,055 | B1 | * | 6/2002 | Silverbrook et al. ..... 455/556.1 |
| 6,430,601 | B1 | | 8/2002 | Eldridge et al. |
| 6,487,189 | B1 | * | 11/2002 | Eldridge et al. ............ 370/338 |

FOREIGN PATENT DOCUMENTS

| EP | 1056247 A2 | * | 11/2000 | .......... H04L/12/58 |
| JP | 2000339237 A | * | 12/2000 | .......... G06F/13/00 |
| JP | 2000-357071 A | | 12/2000 | |
| JP | 2001-10150 A | | 1/2001 | |
| JP | 2001-125982 A | | 5/2001 | |
| JP | 2001245028 A | * | 9/2001 | .......... H04M/1/00 |
| JP | 2002140253 A | * | 5/2002 | .......... G06F/13/00 |
| JP | 2002175212 A | * | 6/2002 | .......... G06F/12/00 |
| JP | 2002176450 A | * | 6/2002 | .......... H04L/12/58 |

OTHER PUBLICATIONS

Related U.S. patent application Ser. No. 09/703,830, filed Nov. 2, 2000; Inventor: Shiro Takagi; Title: Electronic Information Management System.

* cited by examiner

Primary Examiner—Charles M. Nolan, Jr.
Assistant Examiner—Minh Chau
(74) Attorney, Agent, or Firm—Frishauf, Holtz, Goodman & Chick, P.C.

(57) ABSTRACT

In a print service method for a printing system, text data contained in a mail received by a mobile phone owned by a user, and attachment file data attached to the received mail are downloaded into the printing system from the mobile phone. Application software corresponding to the attachment file data is selected from application software stored in the printing system, thereby opening the attachment file data by using the selected application software. The text data and the attachment file data opened by the selected application software are printed onto a printing medium.

31 Claims, 11 Drawing Sheets

EM — To : john@domai1.com
From : david@domai2.com
Subject : meeting

Dear John,

New product planning meeting will be held on June 19,2000 at ABC hotel. Meeting will start at 9am.

Regards,

Dave

Banner advertisement — AD

Date:Mon, 8 Mar 1999 16:47:30 +0900
Message-Id : <2001123456@abcde.co.jp>
MIME-Version : 1.0
From : xyz@abcde.co.jp                             101
Subject : Message from xyz
To : pqr@abcde.co.jp
Content-Type : multipart/mixed ; boundary="aabbcc"

--aabbcc
Content-Type : text/plain
                                                   102
This message is sent from xyz.

--aabbcc
Content-Type : application/msword ; name="sample.doc"
Content-Transfer-Encoding : base 64

SUkpAAgAAAAARAP4ABAAAAAgAAAAAABAwABAAAAwAYAAAAAEBAwABAAAAA
regAAAAAIBAwABAAAAA
AQAAAAMBAwABAAAAAwAAAAAYBAwABAAAAAAoBAwABAAAAAAgAAAABE
BBAABAAAAA7AAAAABIB                                103
:
:
HCQ1AMpmBUDZrAAomxUAZbMCoGXWAJTNCoCyWQFQNisAAAAiAAAAiAQw
AAAAAAAAAAAA=
--aabbcc--

TX — 
To : john@domai1.com
From : david@domai2.com
Subject : meeting

Dear John,

New product planning meeting will be held on June 19,2000 at ABC hotel. Meeting will start at 9am. Hotel location is http://www.abchotel.com/map/

Regards,

Dave

Banner advertisement — AD

PRINTING SERVICE METHOD FOR PRINTING SYSTEM AND THE PRINTING SYSTEM

CROSS-REFERENCE TO RELATED APPLICATIONS

This application is based upon and claims the benefit of priority from the prior Japanese Patent Application No. 2000-303769, filed Oct. 3, 2000, the entire contents of which are incorporated herein by reference.

BACKGROUND OF THE INVENTION

1. Field of the Invention

The present invention relates to a printing service method for a printing system, which is installed in a convenience store or another type of shop and used by unspecified users. The invention also relates to the printing system itself.

2. Description of the Related Art

Mobile phones that provide a function of receiving E-mails are known nowadays. Also, portable terminals capable of receiving E-mails, called "PDAs (Personal Digital Assistants)", are known. These mobile phones or portable terminals do not have a printing function, and hence cannot print an E-mail received. Further, in the mobile phones, in particular, their display screens are small and can display only a limited number of characters. Accordingly, when a phone receives a long mail, it must cut off characters that exceed the limited number. If an E-mail includes an attachment file, this must also be cut since it cannot be displayed. In light of this, a printing technique that uses a short-range radio communication technique called "Bluetooth" has been developed. In this technique, an E-mail received by a mobile phone is transmitted therefrom to a printing apparatus using Bluetooth, where the E-mail is printed.

When using a mobile phone for business, there may be a case in which the user wants to print instantly an E-mail received by their mobile phone in a place where they have gone. In this case, it is very convenient if a printing apparatus or a copy machine with a printing function, which can print the E-mail, is installed in a convenience store, a shop or the like located near the place where they are. Moreover, when printing the E-mail, it is much more useful if the printing process is linked with a process of improving business service.

Therefore, there is a need for a printing service, for a printing system, of receiving, from the terminal of a user, such as a mobile phone, printing data such as a mail or an attachment file received by the terminal, and printing the read data onto a printing medium. There is another need for a printing service of printing an advertisement, requested by an advertiser, onto the printing medium to thereby reduce the printing charge or make it free.

BRIEF SUMMARY OF THE INVENTION

In a print service method for a printing system, text data contained in a mail received by a mobile phone owned by a user, and attachment file data attached to the received mail are downloaded into the printing system from the mobile phone. Application software corresponding to the attachment file data is selected from various types of application software stored in the printing system, thereby opening the attachment file data by using the selected application software. The text data and the attachment file data opened by the selected application software are printed onto a printing medium.

Further, in a printing service method for a printing system that is connectable to an Internet and is provided with a Web browser function, text data contained in a mail received by a mobile phone owned by a user, the text data containing a URL (Uniform Resource Locator), is downloaded into the printing system from the mobile phone. The printing system is connected to the Internet, and Web page data is downloaded by accessing the URL by using the Web browser function of the printing system on the basis of the URL contained in the downloaded text data. The text data and the Web browser data downloaded from the URL are printed onto a printing medium.

BRIEF DESCRIPTION OF THE DRAWINGS

The accompanying drawings, which are incorporated in and form a part of the specification, illustrate embodiments of the invention, and together with the general description given above and the detailed description of the embodiments given below, serve to explain the principles of the invention.

DETAILED DESCRIPTION OF THE INVENTION

An embodiment of the present invention will be described with reference to the accompanying drawings.

Figure 1:
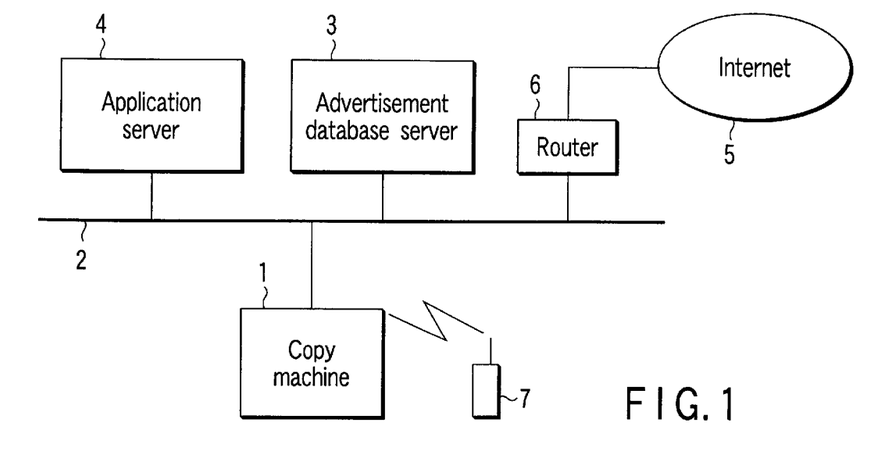
FIG. 1 is a block diagram illustrating the configuration of a printing system according to an embodiment of the invention.

FIG. 1 is a block diagram illustrating the configuration of a printing system according to the embodiment of the invention. In FIG. 1, reference numeral 1 denotes a copy machine installed in, for example, a convenience store or another type of shop, and connected to a LAN 2. The LAN 2 is connected to an advertisement database server 3 that stores advertisement data requested by advertisers. The LAN 2 is further connected to an application server 4 that stores application software used to open various types of attachment files, and to a router 6 connected to the Internet 5. Reference numeral 7 denotes a mobile phone owned by a user.

Figure 2:
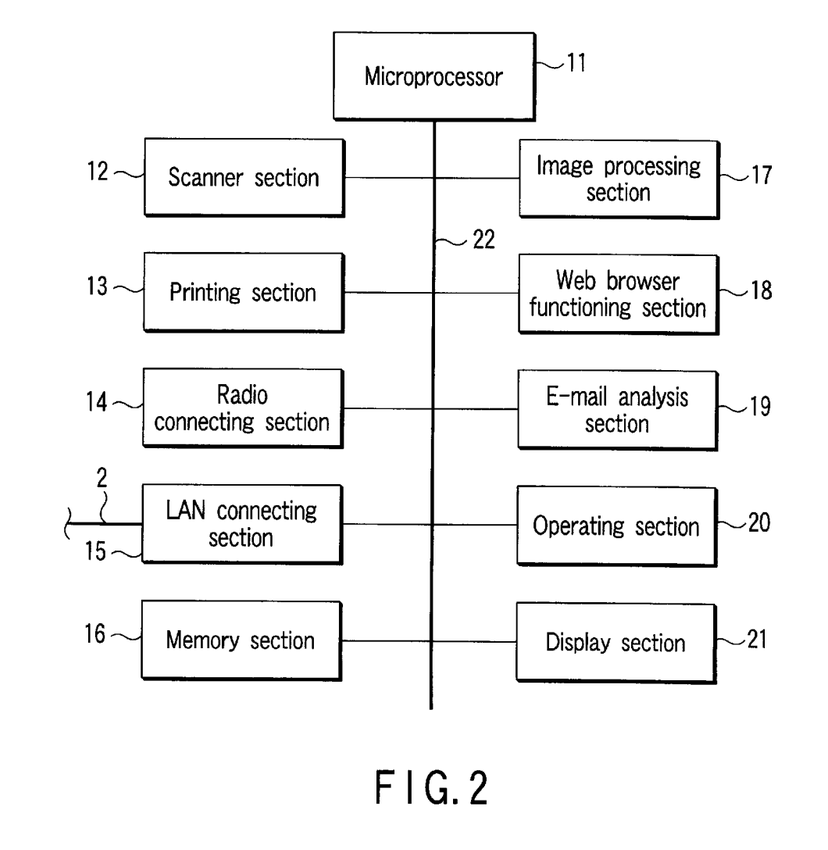
FIG. 2 is a block diagram illustrating the configuration of a copy machine used in the embodiment.

As shown in FIG. 2, the copy machine 1 comprises a microprocessor 11, a scanner section 12, a printing section 13, a radio connecting section 14, a LAN connecting section 15, a memory section 16, an image processing section 17, a Web browser functioning section 18, an E-mail analysis section 19, an operating section 20 and a display section 21, which are electrically connected to one another by a bus line 22. The microprocessor 11 forms a controller main body. The scanner section 12 reads a document. The printing section 13 prints data onto a printing medium such as a paper sheet. The radio connecting section 14 is connected by radio to the mobile phone 7, using, for example, a short-range radio communication system called "Bluetooth", when the mobile phone 7 is positioned near it. The LAN connecting section 15 is connected to the LAN 2 shown in FIG. 1. The memory section 16 stores various types of information. The image processing section 17 executes, for example, editing of image information. The Web browser functioning section 18 accesses a URL on the Internet. The E-mail analysis section 19 analyses an E-mail received. The display section 21 is formed of a liquid crystal display or a CRT, etc.

The copy machine 1 usually executes a copying operation by reading a document using an optical mechanism incorporated in the scanner section 12, and copying the document onto a printing medium by using the printing section 13.

The copy machine 1 can also be used as a printing section in the printing system.

Figure 3:
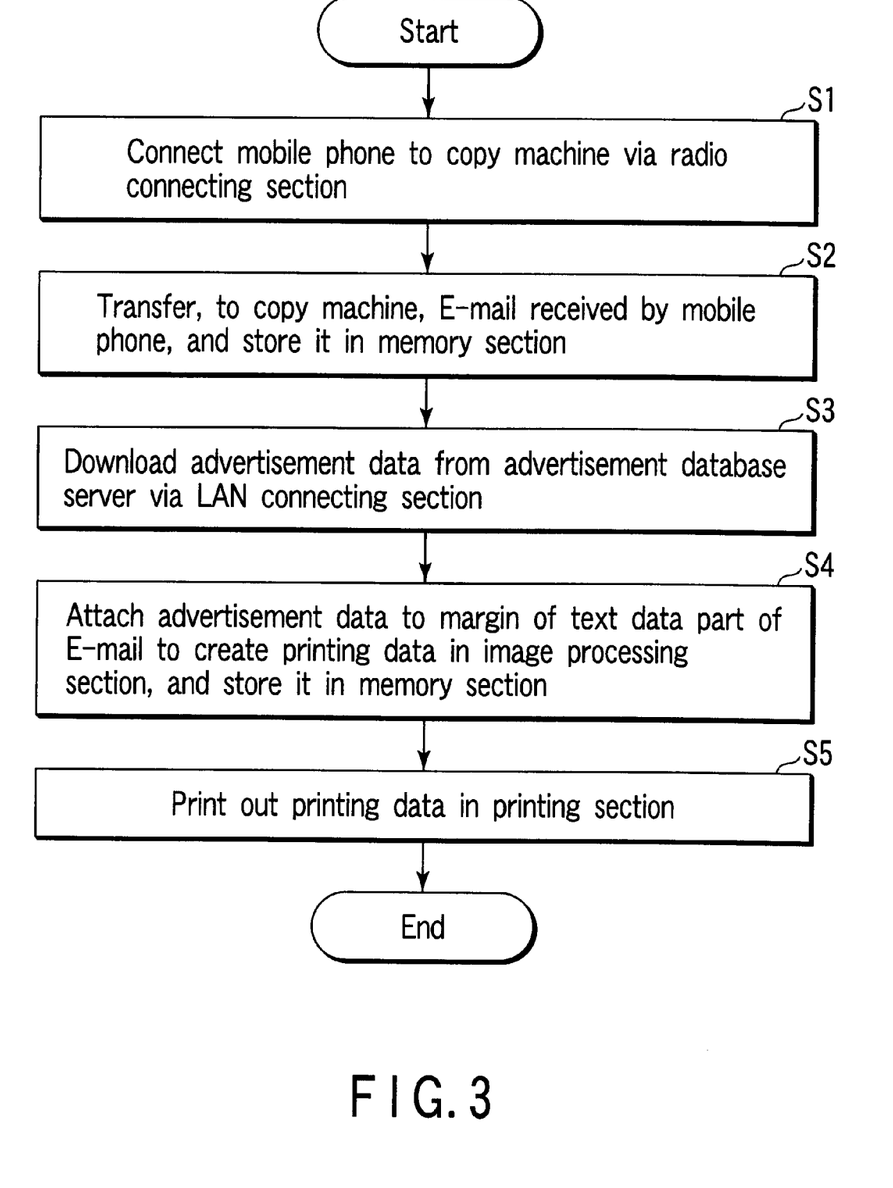
FIG. 3 is a flowchart explaining the procedure of operations executed when receiving, from a mobile phone, an E-mail including text data only.

The operation of the printing system according to the embodiment will be described, citing various examples.

a. When downloading, from a mobile phone, an E-mail that includes text data only:

FIG. 3 is a flowchart explaining the procedure of operations executed when downloading, from a mobile phone, an E-mail including text data only. As illustrated in FIG. 3, at a step S1, the copy machine 1 is connected by radio to the mobile phone 7 via the radio connecting section 14. At a step S2, the mobile phone 7 transfers a received E-mail to the copy machine 1 by radio. Then, the microprocessor 11 of the copy machine 1 stores, in the memory section 16, the E-mail transferred from the mobile phone 7 and received by the radio connecting section 14.

At a step S3, the microprocessor 11 controls the LAN connecting section 15 to make it download advertisement data from the advertisement database server 3. At a step S4, the microprocessor 11 controls the image processing section 17 to make it attach the downloaded advertisement data to the margin of the mail data part of the E-mail, thereby creating printing data and storing the printing data in the memory section 16. At a step S5, the microprocessor 11 reads the printing data from the memory section 16, and controls the printing section 13 to make it print the data onto a printing medium.

Figure 4:
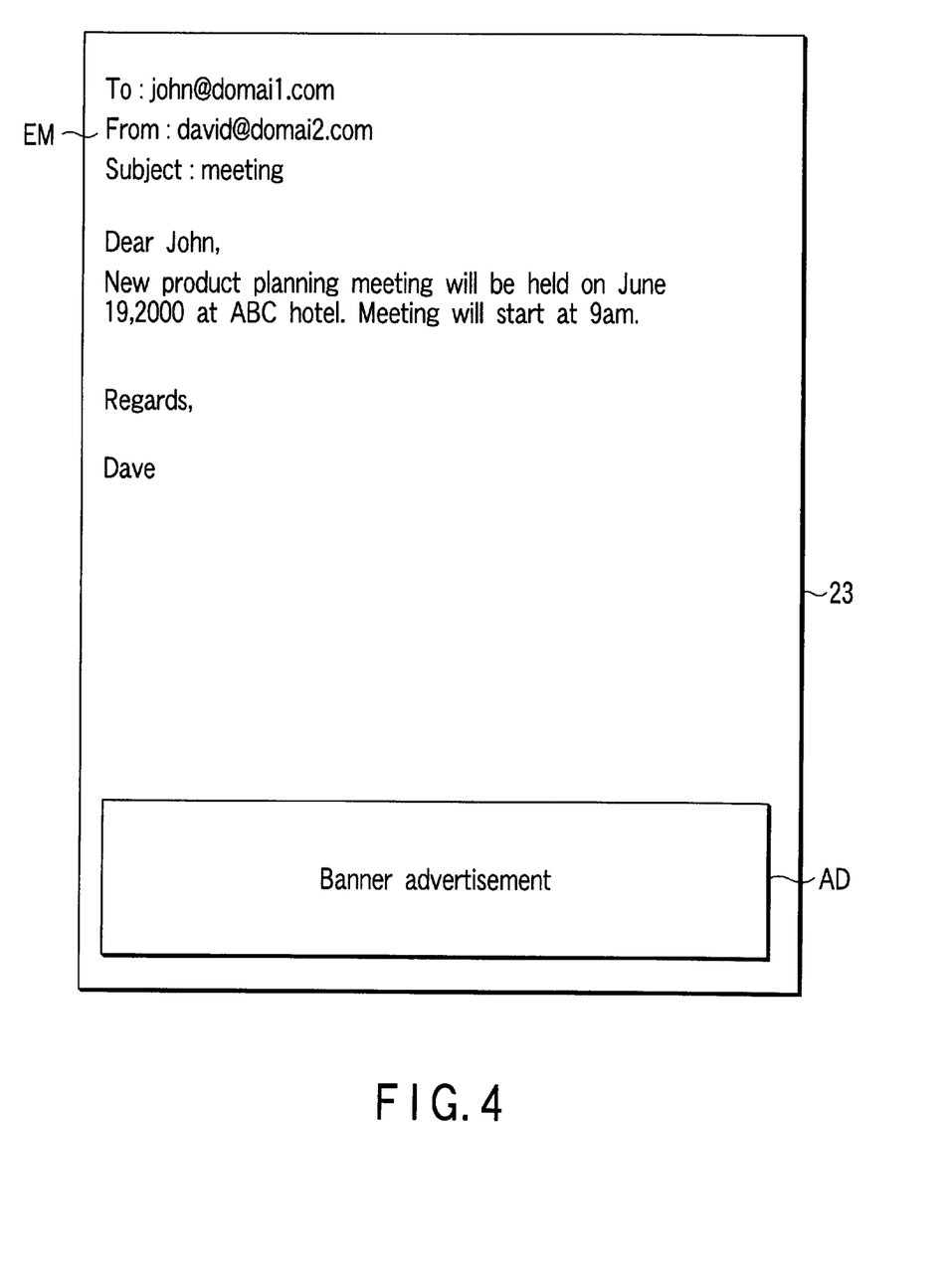
FIG. 4 is a view showing a printing medium printed with text data and advertisement data.
Figure 5:
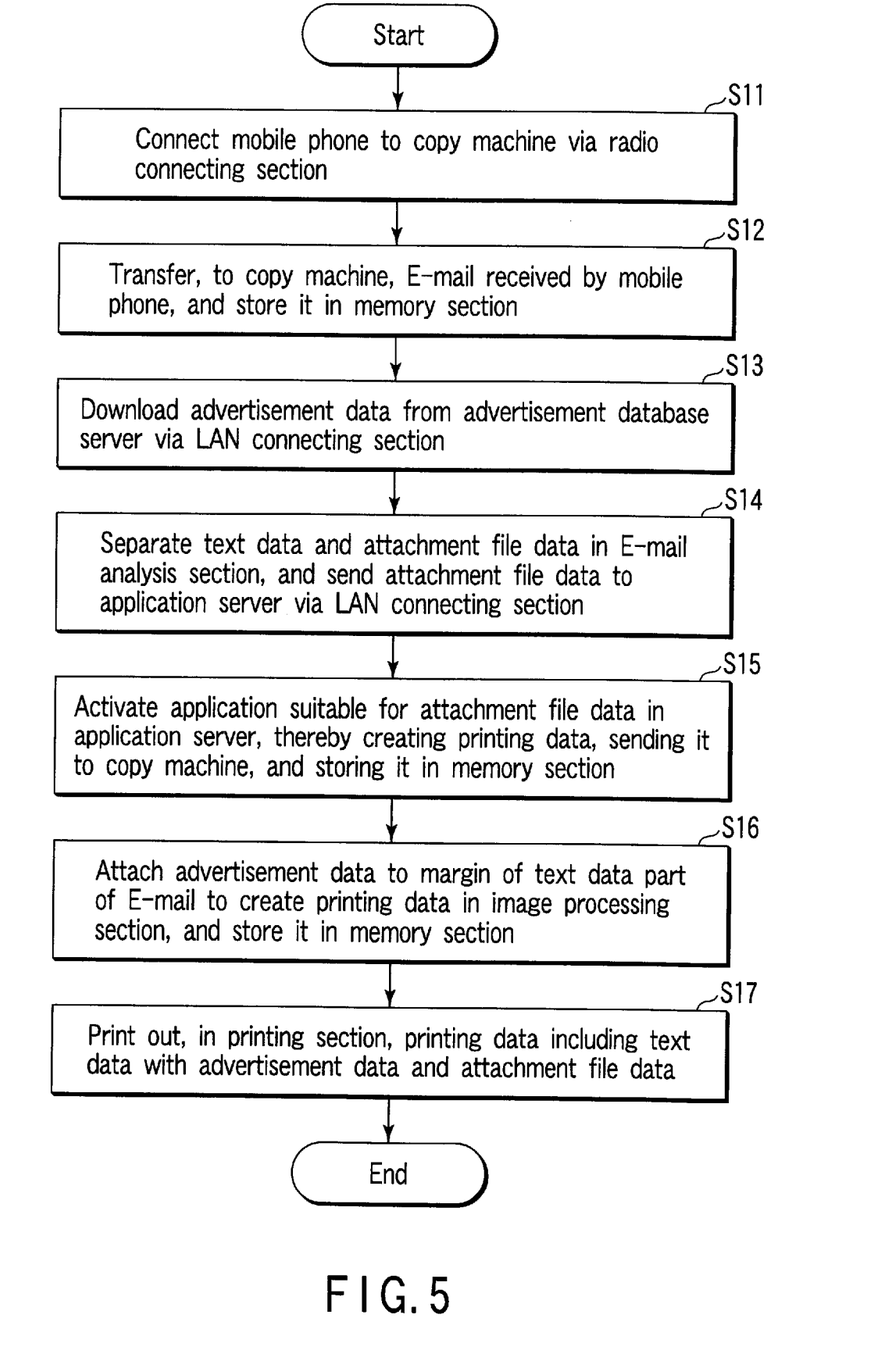
FIG. 5 is a flowchart explaining the procedure of operations executed when receiving, from a mobile phone, an E-mail with attachment file data.

Thus, a printing medium 23 is output, which is printed with the E-mail EM received by the mobile phone 7, and with advertisement data AD on a lower marginal space thereof, as shown in FIG. 4.

b. When downloading, from the mobile phone 7, an E-mail with attachment file data:

In this case, as shown in FIG. 5, at a step S11, the copy machine 1 is connected by radio to the mobile phone 7 via the radio connecting section 14. Subsequently, at a step S12, the mobile phone 7 transfers a received E-mail to the copy machine 1 by radio. The microprocessor 11 of the copy machine 1 stores, in the memory section 16, the E-mail received by the radio connecting section 14.

At a step S13, the microprocessor 11 controls the LAN connecting section 15 to make it download advertisement data from the advertisement database server 3. At a step S14, the microprocessor 11 controls the E-mail analysis section 19 to make it separate the text data and the attachment file data from the E-mail.

Figure 6:
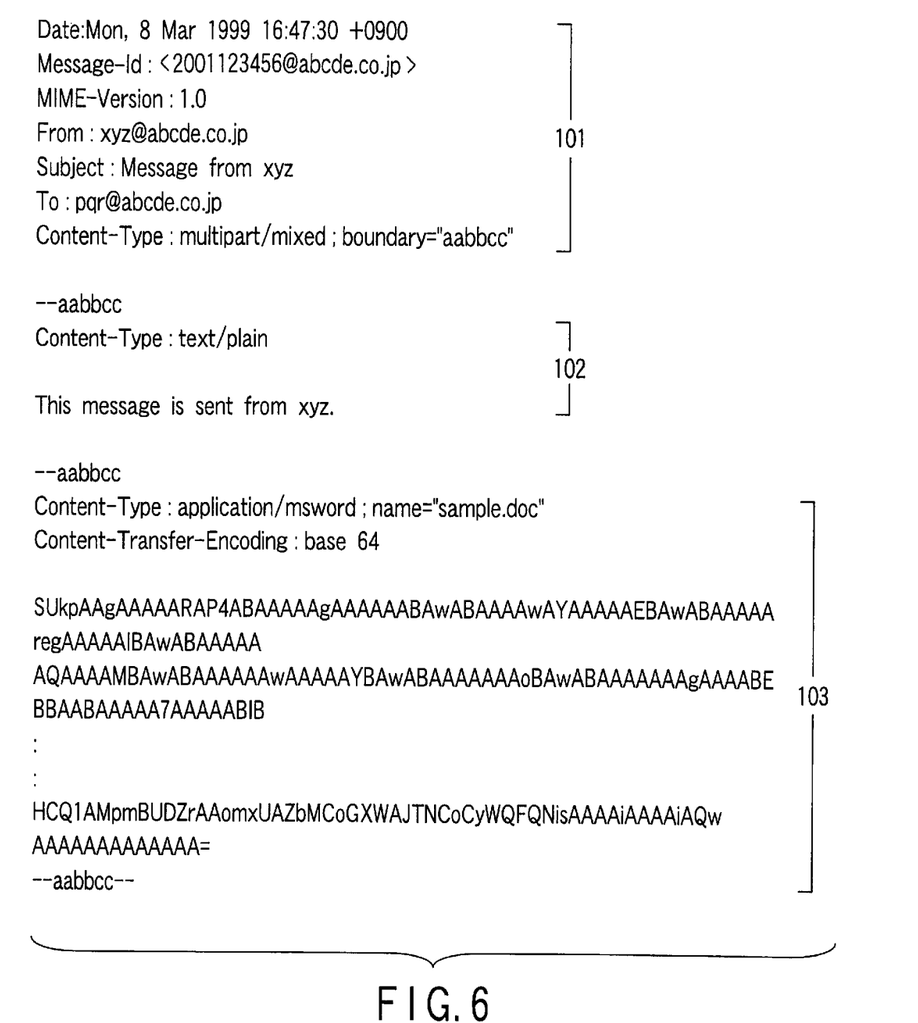
FIG. 6 is a view showing an E-mail example that includes text data and attachment file data.

Referring now to FIG. 6, a description will be given of the process, executed by the E-mail analysis section 19, of determining text data and attachment file data in an E-mail.

FIG. 6 shows an E-mail example. This E-mail includes a header part, a text data part and an attachment file data part. The format of the E-mail is based on the MIME (Multipurpose Internet Mail Extensions) as an E-mail standard. Reference numeral 101 denotes the header part. In this part, since the Content-Type is "multipart/mixed", the E-mail analysis section 19 determines that a plurality of parts exist. The border of each part is recognized by a letter string "aabbcc" that indicates a border. In a part denoted by reference numeral 102, the Content-Type is "text/plain". On the basis of the identifier "text/plain", the E-mail analysis section 19 determines that the part 102 is the text data part. In a part denoted by reference numeral 103, the Content-Type is "application/msword". The E-mail analysis section 19 determines, from the identifier "application", that the part 103 is the attachment file data part, and specifies the application software from the identifier "msword". Further, since the Content-Transfer-Encoding is "base64", it is determined that the attachment file data is "base64"-encoded data. Accordingly, the attachment file data is subjected to "base64" decoding, thereby generating binary data. In the part 103, if the Content-Type is "application/octet-stream", the application cannot be specified. In this case, the application may be determined on the basis of a filename extension.

After that, the microprocessor 11 controls the LAN connecting section 15 to make it send the attachment file data to the application server 4.

At a step S15, the application server 4 activates an application software suitable for the received attachment file data, thereby generating printing data and transferring it to the copy machine 1. Then, the microprocessor 11 of the copy machine 1 stores, in the memory section 16, the printing data transferred from the application server 4 to the LAN connecting section 15.

Figure 7:
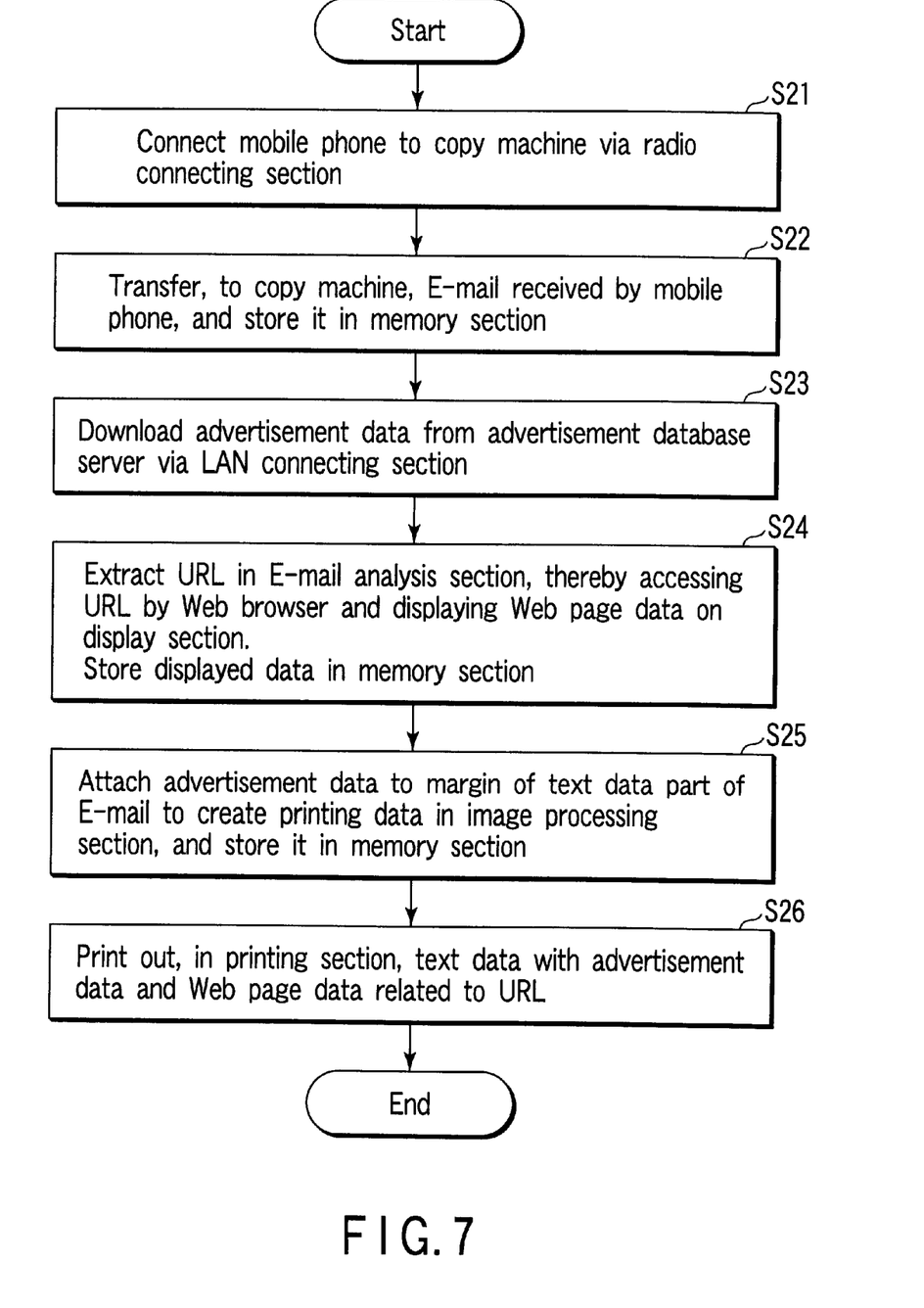
FIG. 7 is a flowchart explaining the procedure of operations executed when receiving, from a mobile phone, an E-mail in which a URL is written.

At a step S16, the microprocessor 11 controls the image processing section 17 to make it attach the downloaded advertisement data to the margin of the text data part of the E-mail, thereby generating printing data and storing the printing data in the memory section 16. At a step S17, the microprocessor 11 reads, from the memory section 16, the printing date of the text data with the advertisement data attached thereto and the printing data of the attachment file data, and controls the printing section 13 to make it print the read data items onto a printing medium.

c. When downloading, from the mobile phone 7, an E-mail in which a URL (Uniform Resource Locator) is written:

In this case, as shown in FIG. 7, at a step S21, the copy machine 1 is connected by radio to the mobile phone 7 via the radio connecting section 14. Subsequently, at a step S22, the mobile phone 7 transfers a received E-mail to the copy machine 1 by radio. The microprocessor 11 of the copy machine 1 stores, in the memory section 16, the E-mail received by the radio connecting section 14.

At a step S23, the microprocessor 11 controls the LAN connecting section 15 to make it download advertisement data from the advertisement database server 3. At a step S24, the microprocessor 11 controls the E-mail analysis section 19 to make it extract a URL from the E-mail.

Figure 8:
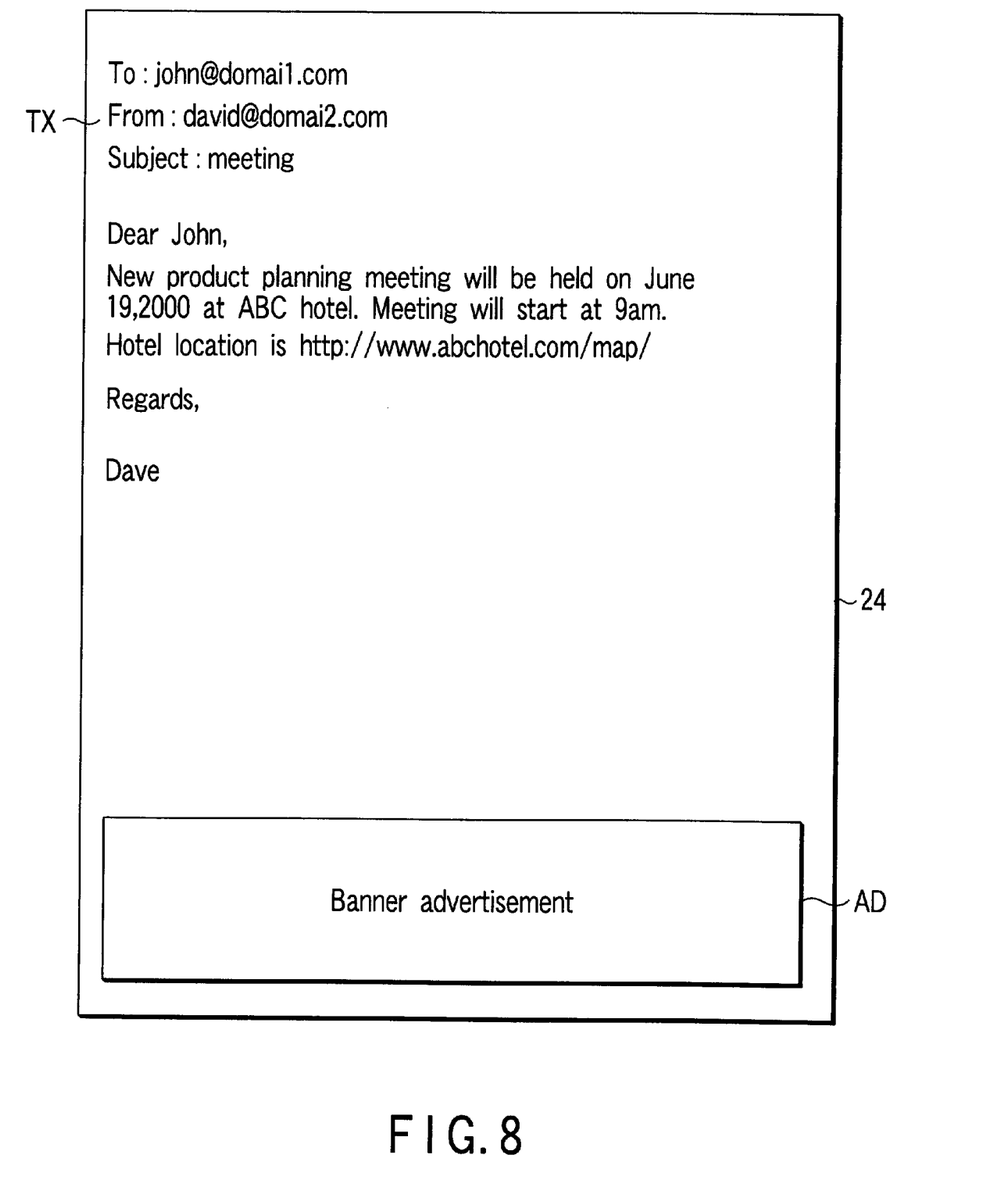
FIG. 8 is a view illustrating a printing medium printed with text data of an E-mail and advertisement data.

FIG. 8 shows an E-mail example that contains a URL. If the text data of the E-mail contains "http://", the E-mail analysis section 19 recognizes and extracts, as a URL, data ranging from "http://" to the next word spacing.

The microprocessor 11 controls the Web browser functioning section 18 to make it access the URL on the Internet 5 via the LAN connecting section 15 and the LAN 2, thereby displaying accessed Web page data on the display section 21. The microprocessor 11 stores the displayed Web page data in the memory section 16.

Subsequently, at a step S25, the microprocessor 11 controls the image processing section 17 to make it attach the downloaded advertisement data to the margin of the text data part of the E-mail, thereby generating printing data and storing the printing data in the memory section 16. At a step S26, the microprocessor 11 reads, from the memory section 16, the printing data of the text data with the advertisement data attached thereto and the Web page data related to the URL, and controls the printing section 13 to make it print the read data items onto a printing medium.

Figure 9:
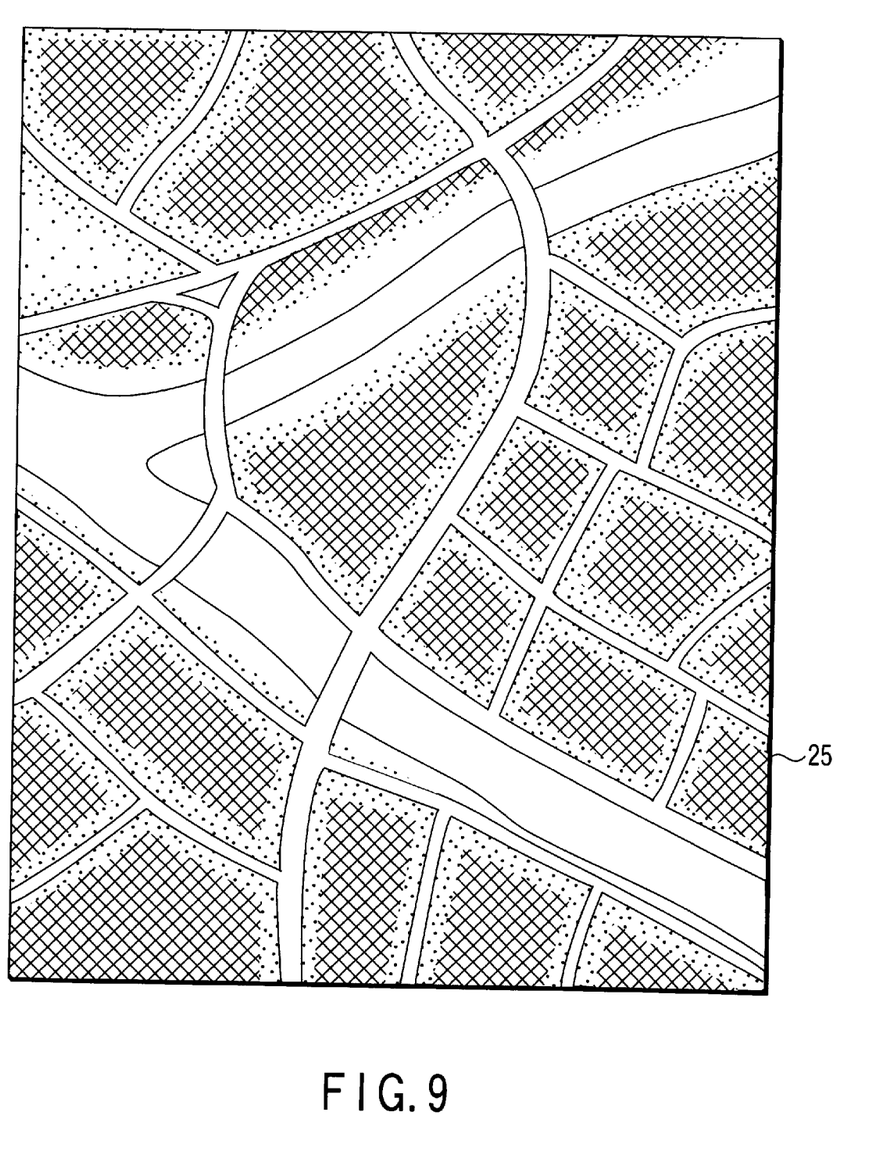
FIG. 9 is view illustrating a printing medium printed with Web page data related to the URL.
Figure 10:
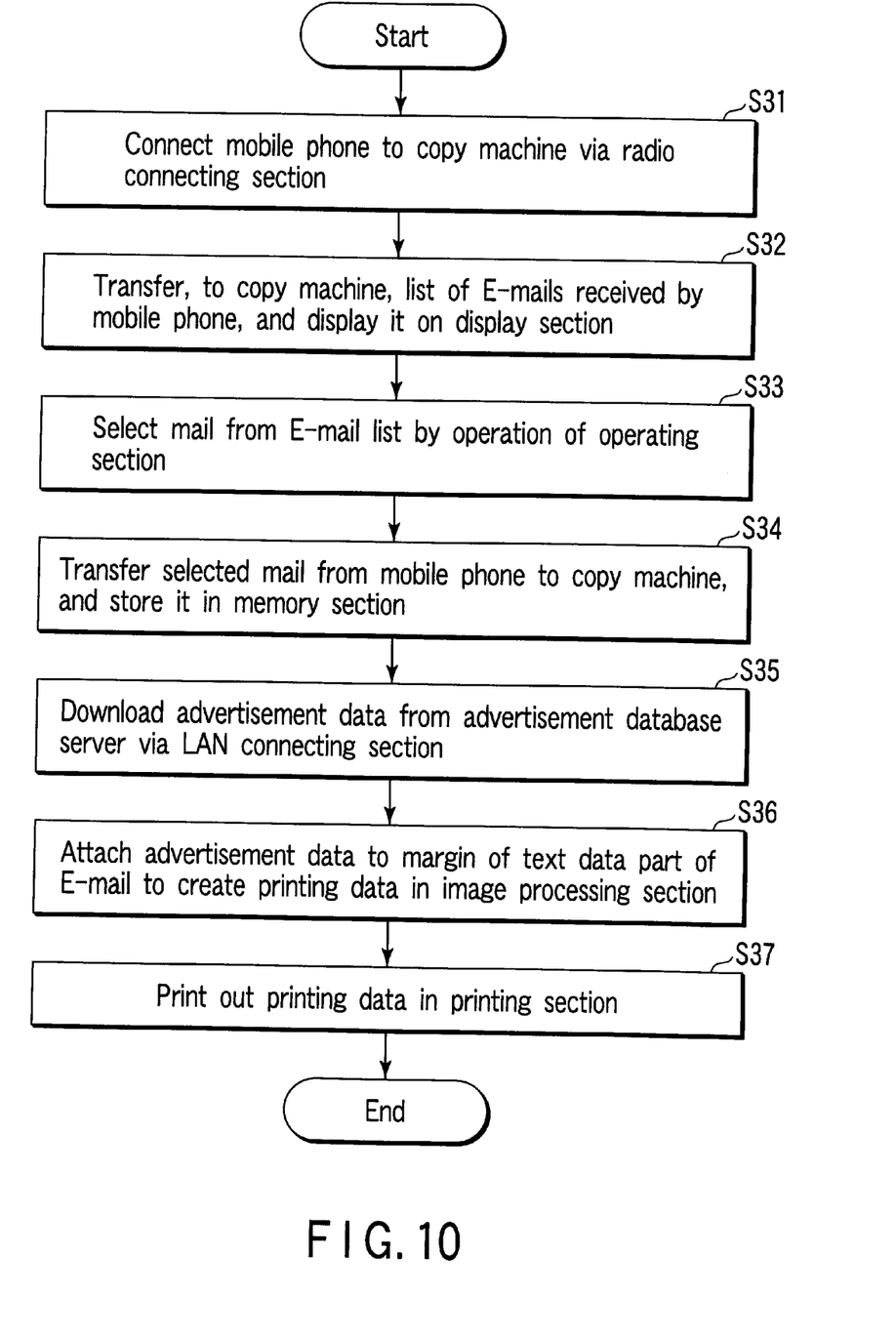
FIG. 10 is a flowchart explaining the procedure of operations executed when selecting a printing mail from a plurality of E-mails received by a mobile phone.

Thus, a printing medium 24 is output, which is printed with text data TX of the E-mail EM received by the mobile phone 7, and with advertisement data AD on an empty space thereof, as shown in FIG. 8. Further, as shown in FIG. 9, another printing medium 25 is output, on which a map is printed with the Web page data related to the URL, in case the Web page data related to the URL is map data.

d. When printing an E-mail selected from a plurality of E-mails received by the mobile phone 7:

In this case, as shown in FIG. 10, at a step S31, the copy machine 1 is connected by radio to the mobile phone 7 via the radio connecting section 14. At a step S32, the mobile phone 7 transfers a list of received E-mails to the copy machine 1 by radio. The microprocessor 11 of the copy machine 1 displays, on the display section 21, the list of E-mails received by the radio connecting section 14.

At a step S33, the user operates the operating section 20 while seeing the screen of the display section 21, to select, from the E-mail list, an E-mail that the user would like to print out. At a step S34, the selected E-mail is transmitted from the mobile phone 7 to the copy machine 1. The microprocessor 11 of the copy machine 1 stores, in the memory section 16, the E-mail received by the radio connecting section 14.

Figure 11:
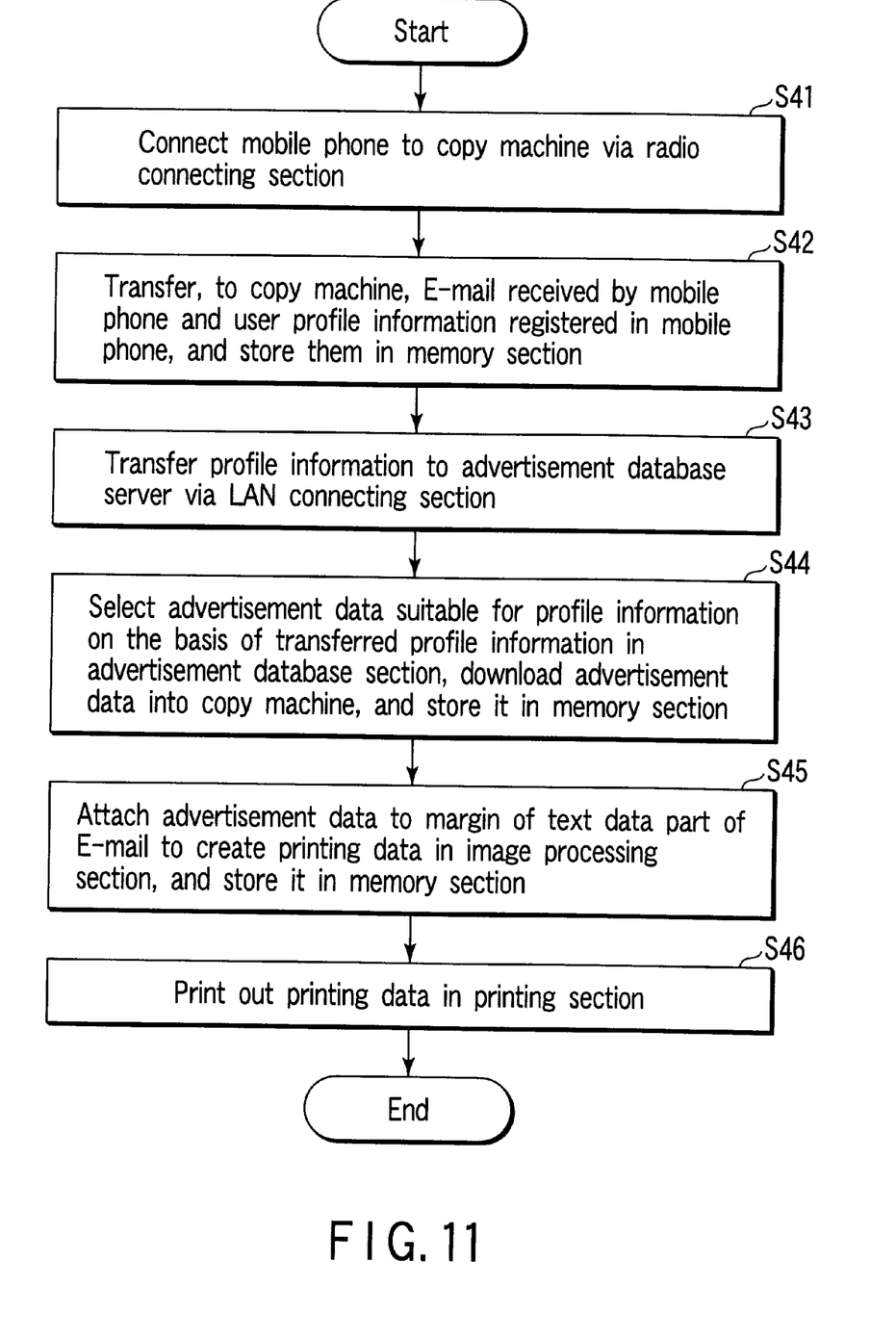
FIG. 11 is a flowchart explaining the procedure of operations executed when receiving an E-mail from a mobile phone in which user profile information is registered.

Thereafter, at a step S35, the microprocessor 11 controls the LAN connecting section 15 to make it download advertisement data from the advertisement database server 3. At a step S36, the microprocessor 11 controls the image processing section 17 to make it attach the downloaded advertisement data to the margin of the mail data part of the E-mail, thereby generating printing data and storing the printing data in the memory section 16. At a step S37, the microprocessor 11 reads the printing data from the memory section 16, and controls the printing section 13 to make it print the read data onto a printing medium.

e. When downloading an E-mail received by a mobile phone 7 in which profile information concerning the user is registered:

In this case, as shown in FIG. 11, at a step S41, the copy machine 1 is connected by radio to the mobile phone 7 via the radio connecting section 14. At a step S42, the mobile phone 7 transfers a received E-mail and the registered user profile information to the copy machine 1 by radio. The profile information includes the sex, age, tastes and ideas, etc. of the user. The microprocessor 11 of the copy machine 1 stores, in the memory section 16, the E-mail and the user profile information received by the radio connecting section 14.

Thereafter, at a step S43, the microprocessor 11 controls the LAN connecting section 15 to make it transfer the user profile information to the advertisement database server 3. At a step S44, the advertisement database server 3 selects advertisement data suitable for the received user profile information, and transfers the selected data to the copy machine 1. The copy machine 1 downloads the advertisement data via the LAN connecting section 15, and stores it in the memory section 16.

Figure 12:
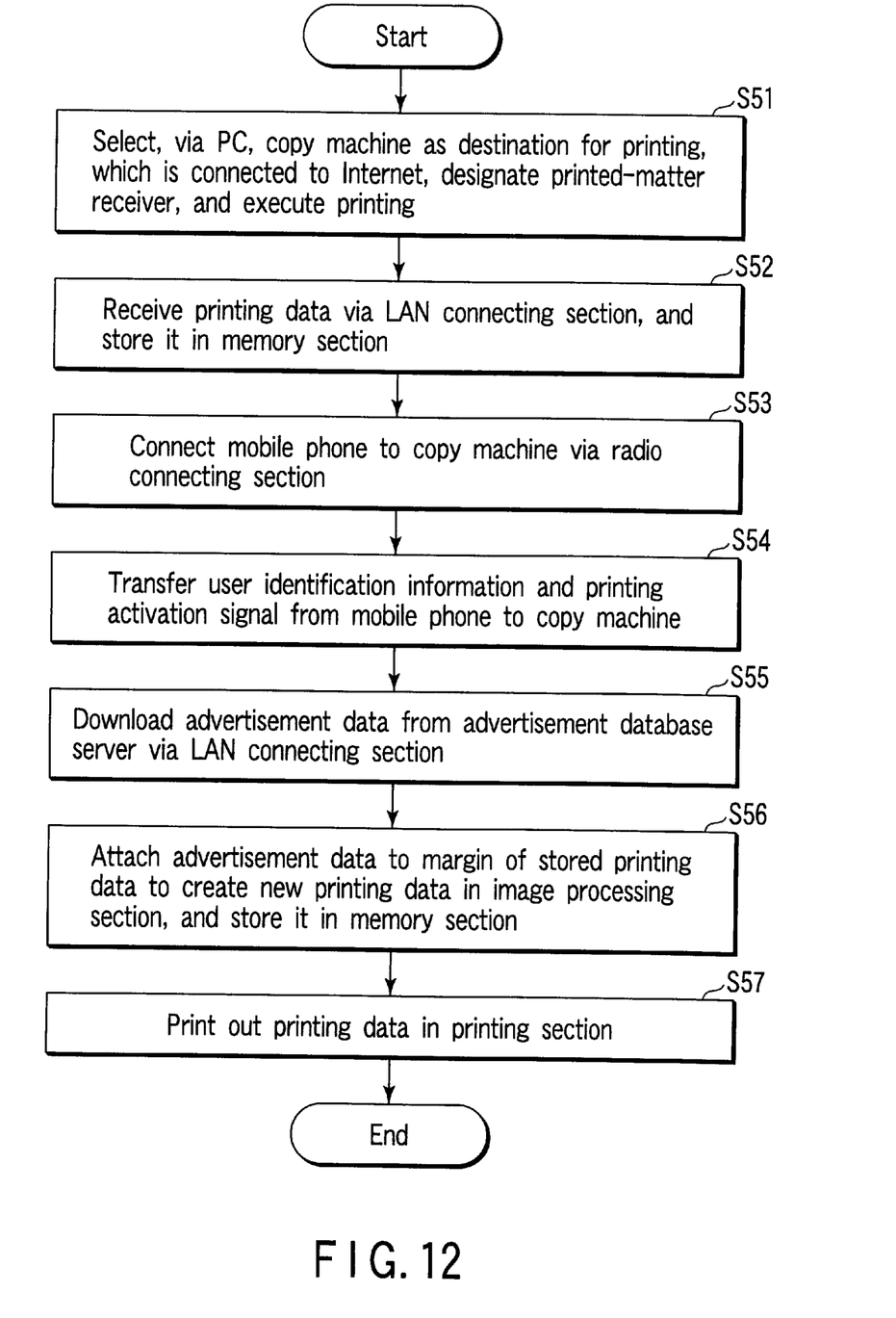
FIG. 12 is a flowchart explaining the procedure of operations executed when receiving printing data from a personal computer connected to the Internet, and printing the received data.

At a step S45, the microprocessor 11 controls the image processing section 17 to make it attach the downloaded advertisement data to the margin of the mail data part of the E-mail, thereby generating printing data and storing the printing data in the memory section 16. At a step S46, the microprocessor 11 reads the printing data from the memory section 16, and controls the printing section 13 to make it print the read data onto a printing medium.

f. When downloading printing data from a PC (Personal Computer) connected to the Internet, and printing it:

In this case, as shown in FIG. 12, at a step S51, the PC designates, as a destination for printing, a copy machine 1 connected to the Internet 5, and also designates the receiver of resultant printed matter. The receiver of the printed matter is designated by using, for example, a phone number of a mobile phone 7 owned by the receiver as identification information. After that, printing data is transmitted to the copy machine 1. At a step S52, the microprocessor 11 of the copy machine 1 controls the LAN connecting section 15 so as to receive the printing data from the PC, and stores the received data in the memory section 16.

In this state, the receiver of the printed matter, who owns the mobile phone 7, visits a convenience store, a shop or the like, and executes a predetermined operation near the copy machine 1 installed in the store. The microprocessor 11 of the copy machine 1 controls, at a step S53, the radio connecting section 14 so as to connect the copy machine 1 to the mobile phone 7 by radio. At a step S54, the mobile phone 7 transfers, to the copy machine 1 by radio, the phone number as identification information and a printing activation signal.

At a step S55, the microprocessor 11 of the copy machine 1 compares the mobile phone number received by the radio connecting section 14, with that stored in the memory section 16. If they are identical to each other, the microprocessor 11 controls the LAN connecting section 15 to make it download advertisement data from the advertisement database server 3. At a step S56, the microprocessor 11 controls the image processing section 17 to make it attach the downloaded advertisement data to the margin of the data part of the printing data stored in the memory section 16, thereby generating new printing data and storing it in the memory section 16. At a step S57, the microprocessor 11 reads the printing data with the advertisement data from the memory section 16, and controls the printing section 13 to make it print the read data onto a printing medium.

As described above, an E-mail received by a mobile phone 7 owned by a user, or printing data supplied from the PC can be printed out by the printing section 13 of a copy machine 1, which is installed in a convenience store, a shop or the like. In this case, advertisement data can also be printed on a printing medium, together with the printing data, by using an empty space of the printing medium. This enables acquisition of an advertisement fee from an advertiser, and hence enables a printing charge to be paid by the user to be discounted or made free, thereby improving the service.

Further, it can be set such that the printing operation is executed only after the user is identified by using the phone number of the mobile phone 7. Therefore, printed data can be reliably supplied to the user.

Furthermore, in case an E-mail contains an attachment file date, the attachment file data can be opened by appropriate application software stored in the application server 4, and can be printed by the printing section 13.

Also, in case a URL is written in an E-mail, Web page data related to the URL can be accessed via the Internet, by using the Web browser function, and be printed by the printing section 13.

Thus, the printing system can sufficiently satisfy various demands of users and enhance the versatility of the copy machine 1.

Moreover, when the mobile phone 7 has received a plurality of E-mails, a list of E-mails received is displayed on the display section 21 of the copy machine 1 without automatically printing the E-mails, thereby enabling the user to print out only a selected E-mails. In other words, the user can dispense with unnecessary printing. Also in this point, the service to the user can be improved.

In the case where the profile information of the user is registered in the mobile phone 7, advertisement data downloaded from the advertisement database server 3 can be selected on the basis of the user profile information, thereby printing out advertisement data suitable for the profile information. Accordingly, an appropriate and useful advertisement can be provided for the user.

Further, since the copy machine 1 comprises the Web browser functioning section 18, the display section 21 and the operating section 20, a user who does not have a mobile phone can access a Web site and print out Web page data related to a URL by operating the operating section 20 and using the printing section 13. Also in this case, of course, Web page data with advertisement data attached thereto can be printed out.

Like some types of mobile phones that provide an Internet access function, the copy machine 1 may include an Internet access function. In this case, an image displayed by using the Internet access function can also be printed out. If an address to be linked is registered on a screen set up by the Internet access function, the Web page can be displayed on the display section 21, by using the Web browser functioning section 18, and also can be printed out.

Although, in the above-described embodiment, advertisement data is stored in the advertisement database server 3, the invention is not necessarily limited to this configuration. The configuration may be modified such that the copy machine 1 contains an advertisement database, and the copy machine 1 itself adds advertisement data to text data.

Further, although, in the above-described embodiment, when printing text data onto a printing medium, advertisement data is downloaded from the advertisement database server 3 and added to text data, and the text data with the advertisement data is printed onto a printing medium, the invention is not necessarily limited to this. The text data may be printed onto a printing medium that has its reverse surface or a predetermined portion of its top surface pre-printed with an advertisement.

Although, in the above embodiment, printing data is printed with advertisement data attached thereto, the invention is not limited to this. The user may select whether or not advertisement data should be added. If the user does not want to add advertisement data, a standard printing charge may be required to the user, instead of attaching the advertisement data. In this case, the user may pay the printing charge by cash or by online accounting that is executed by using the mobile phone 7.

Although the above embodiment employs a short-range radio communication system, such as Bluetooth, to connect a mobile phone to a copy machine, the invention is not limited to this. They may be physically connected by using, for example, a socket.

Furthermore, in the embodiment, printing data is printed out with advertisement data attached thereto. However, the invention is not limited to this, but may be modified such that a coupon ticket, for example, which is usable in a store providing a copy machine, or other stores may be printed in place of the advertisement data.

Although the embodiment employs a copy machine, an exclusive printing apparatus may be used instead.

In the embodiment, an E-mail is downloaded from a mobile phone. However, another type of portable terminal, such as a PDA (Personal Digital Assistant) or a mobile device, may be used in place of the mobile phone.

Yet further, the embodiment employs the application server 4, and a file data attached to an E-mail is opened by application software stored in the application server 4, and then downloaded into the copy machine 1. However, the invention is not limited to this. The copy machine 1 may download the application software from the application server 3 and open the attachment file data. Alternatively, various types of application software may be pre-stored in the copy machine 1, thereby enabling the copy machine 1 itself to open the attachment file data.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A print service method for a printing system, comprising:

downloading, into the printing system from a mobile phone owned by a user, text data contained in a mail received by the mobile phone, and attachment file data attached to the received mail;

selecting application software, corresponding to the attachment file data, from application software stored in the printing system, and opening the attachment file data by using the selected application software; and printing, onto a printing medium, the text data and the attachment file data opened by the selected application software.

2. The printing service method according to claim 1, wherein the printing medium is pre-printed with advertisement data.

3. The printing service method according to claim 2, wherein the printing is free of charge.

4. The printing service method according to claim 2, wherein a charge for the printing is discounted.

5. The printing service method according to claim 1, further comprising adding advertisement data to the text data.

6. The printing service method according to claim 5, wherein the printing is free of charge.

7. The printing service method according to claim 5, wherein a charge for the printing is discounted.

8. The printing service method according to claim 5, wherein profile information on the user is registered in the mobile phone of the user, and said downloading comprising downloading the profile information, and said adding comprising selecting advertisement data suitable for the profile information, and adding the selected advertisement data to the text data.

9. The printing service method according to claim 1, wherein said downloading comprises:

downloading, from the mobile phone of the user, a list of mails received by the mobile phone of the user;

allowing the user to select a printing mail from the list; and downloading, from the mobile phone of the user into the printing system, text data contained in a selected mail, and attachment file data attached to the selected mail.

10. A printing service method for a printing system that is connectable to an Internet and is provided with a Web browser function, comprising:

downloading, into the printing system from a mobile phone owned by a user, text data contained in a mail received by the mobile phone, the text data containing a URL;

connecting the printing system to the Internet, accessing the URL by using the Web browser function of the printing system on the basis of the URL contained in the downloaded text data, and downloading Web browser data; and printing, onto a printing medium, the text data and the Web browser data.

11. The printing service method according to claim 10, wherein the printing medium is pre-printed with advertisement data.

12. The printing service method according to claim 11, wherein the printing is free of charge.

13. The printing service method according to claim 11, wherein a charge for the printing is discounted.

14. The printing service method according to claim 10, further comprising adding advertisement data to the text data.

15. The printing service method according to claim 14, wherein the printing is free of charge.

16. The printing service method according to claim 14, wherein a charge for the printing is discounted.

17. The printing service method according to claim 14, wherein profile information on the user is registered in the mobile phone of the user, and said downloading comprising downloading the profile information, and said adding comprising selecting advertisement data suitable for the profile information, and adding the selected advertisement data to the text data.

18. The printing service method according to claim 10, wherein said downloading comprises:

downloading, from the mobile phone of the user, a list of mails received by the mobile phone of the user;

allowing the user to select a printing mail from the list; and downloading, from the mobile phone of the user into the printing system, text data contained in a selected mail and containing the URL.

19. A printing service method for a printing system that is connectable to an Internet, and is provided with an Internet printing function and a user identification function, the method comprising:

connecting the printing system to the Internet, and downloading printing data and identification information of the user into the printing system from a terminal connected to the Internet;

downloading identification information of the user from a mobile phone to the printing system;

determining whether or not the identification information downloaded from the terminal is identical to the identification information downloaded from the mobile phone; and printing the printing data onto a printing medium, if the two identification information are identical to each other.

20. The printing service method according to claim 19, wherein the printing medium is pre-printed with advertisement data.

21. The printing service method according to claim 20, wherein the printing is free of charge.

22. The printing service method according to claim 20, wherein a charge for the printing is discounted.

23. The printing service method according to claim 19, further comprising adding, to the printing data, advertisement data stored in the printing system, and printing out the printing data with the advertisement data.

24. The printing service method according to claim 23, wherein the printing is free of charge.

25. The printing service method according to claim 23, wherein a charge for the printing is discounted.

26. A printing system comprising:

a radio connecting section configured to receive an E-mail transferred from a mobile phone owned by a user;

an E-mail analysis section configured to separate the E-mail, received by said radio connecting section, into text data and attachment file data;

a printing section configured to print the text data and the attachment file data onto a printing medium; and a microprocessor configured to make said radio connecting section receive an E-mail, to make said E-mail analysis section separate the received E-mail into the text data and the attachment file data, to select application software, corresponding to the separated attachment file data, from application software stored in the printing system, to open the attachment file data by using the selected application software, and to make said printing section to print, onto the printing medium, the separated text data and the attachment file data opened by the selected application software.

27. The printing system according to claim 26, wherein the printing medium is pre-printed with advertisement data.

28. The printing system according to claim 26, wherein the microprocessor is further configured to add advertisement data, stored in the printing system, to the separated text data.

29. A printing system comprising:

a radio connecting section configured to receive an E-mail transferred from a mobile phone owned by a user;

an E-mail analysis section configured to extract text data and a URL from the E-mail received by said radio connecting section;

a Web browser functioning section configured to access the extracted URL via an Internet, thereby acquiring Web page data related to the extracted URL;

a printing section configured to print the text data and the Web page data related to the URL onto a printing medium; and a microprocessor configured to make said radio connecting section receive an E-mail, to make said E-mail analysis section extract text data and a URL from the received E-mail, to make said Web browser functioning section access the extracted URL and acquire Web page data related to the URL, and to make said printing section to print, onto the printing medium, the extracted text data and the Web page data related to the URL.

30. The printing system according to claim 29, wherein the printing medium is pre-printed with advertisement data.

31. The printing system according to claim 29, wherein said microprocessor is further configured to add advertisement data, stored in the printing system, to the extracted text data.

* * * * *